UNITED STATES PATENT OFFICE.

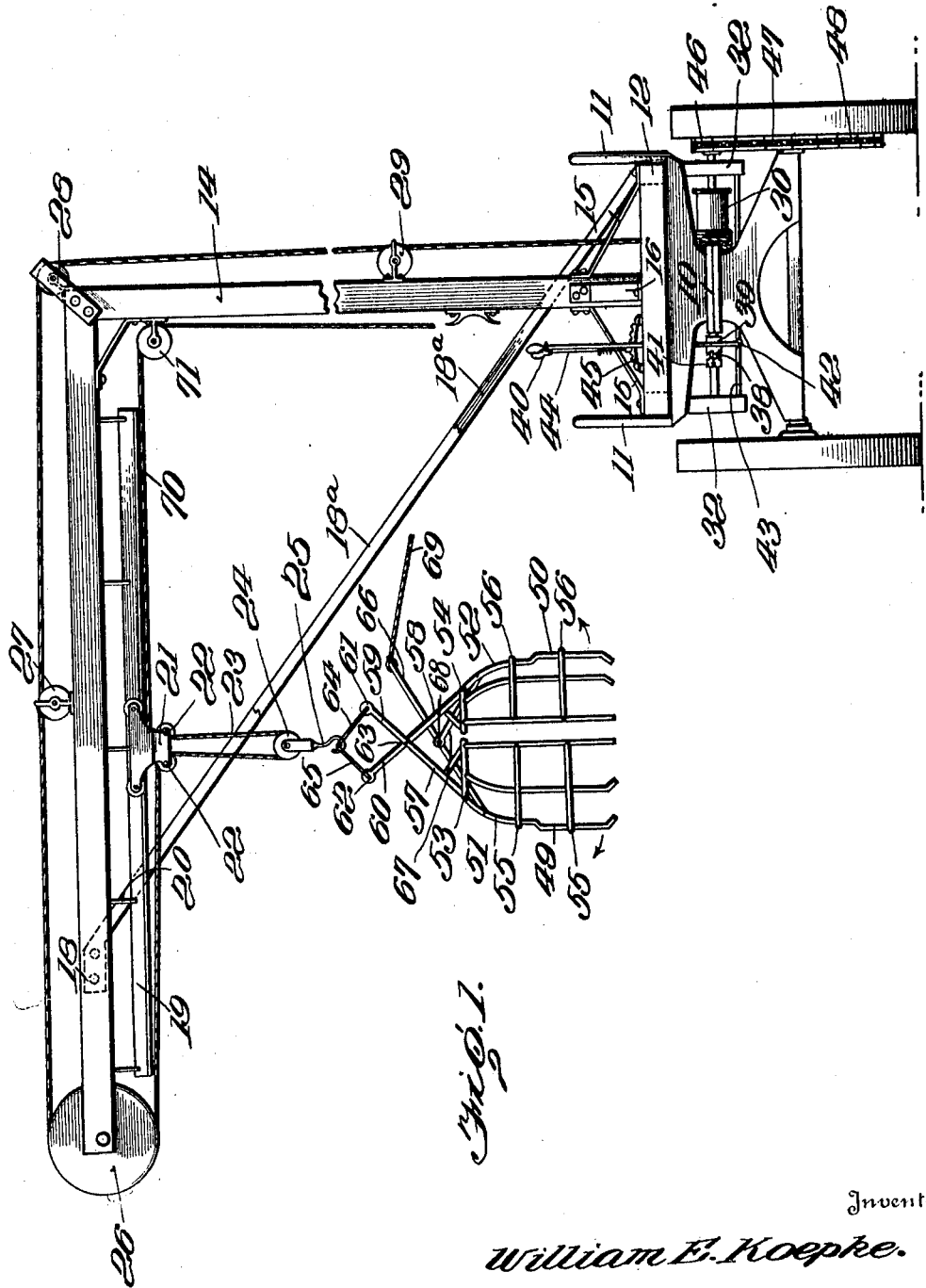

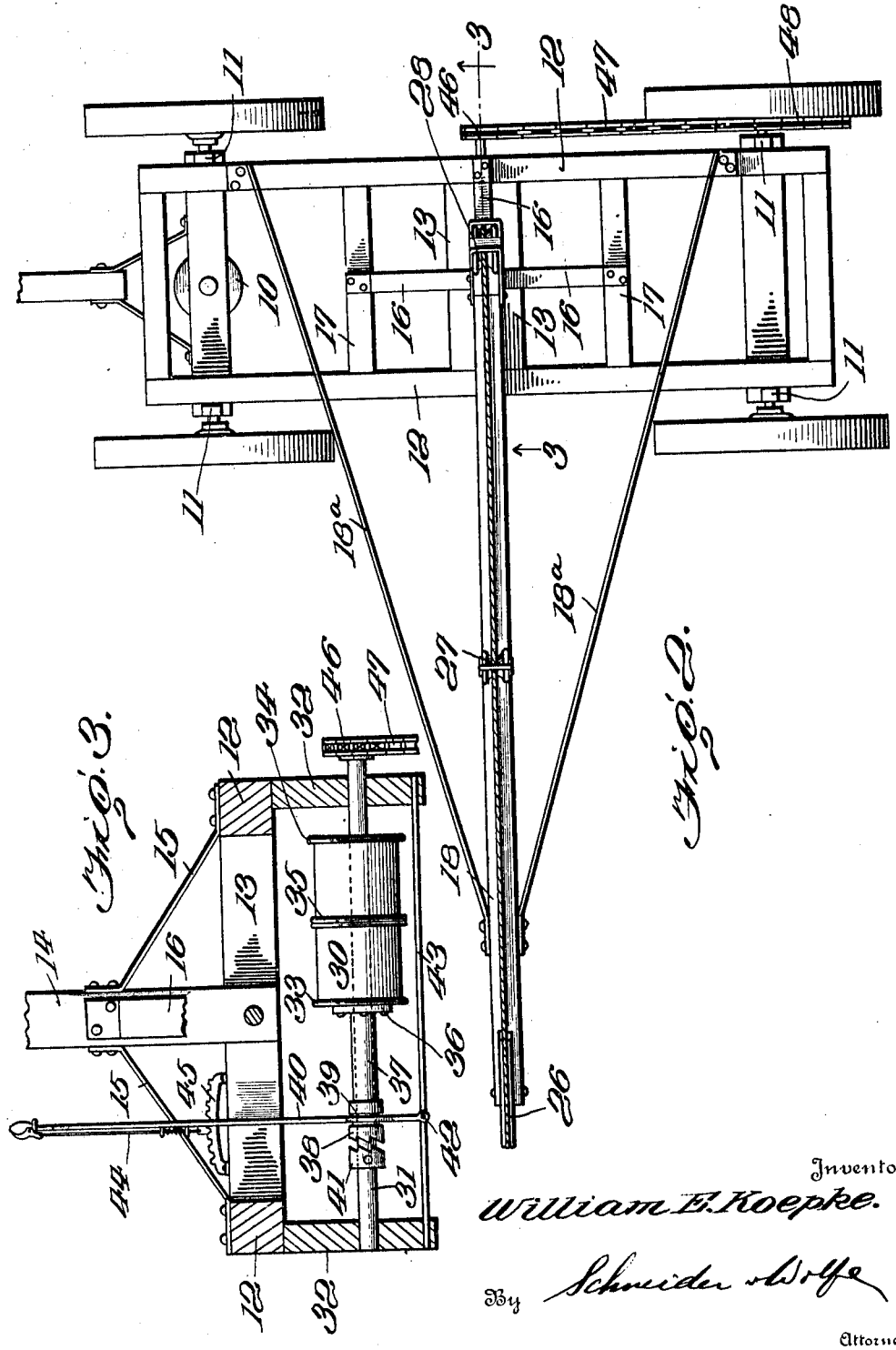

WILLIAM E. KOEPKE, OF SISSETON, SOUTH DAKOTA.

SHOCK-LOADER.

1,314,815.  Specification of Letters Patent.  Patented Sept. 2, 1919.

Application filed June 1, 1917. Serial No. 172,313.

*To all whom it may concern:*

Be it known that I, WILLIAM ERNST KOEPKE, a citizen of the United States, and a resident of Sisseton, in the county of Roberts and State of South Dakota, have invented certain new and useful Improvements in Shock-Loaders, of which the following is a specification.

This invention relates to a device for loading hay shocks or grain, and the like and in particular to a device which may be readily mounted upon or removed from an ordinary wagon. The objects of my invention are to produce a device which may be inexpensively constructed and which may be readily applied to an ordinary wagon of standard size and which will be rapid and efficient in operation.

In the accompanying drawing—

Figure 1 is a front elevation of the device,

Fig. 2 is a plan view thereof and

Fig. 3 is a detail sectional view on line 3—3 of Fig. 2.

10 is an ordinary wagon body of standard size, from which the bed has been removed, and which is provided, as is usual, with four vertical stakes 11. 12 is a frame constructed of heavy wooden beams or of steel, and is of such size as to fit exactly between the stakes 11 of the wagon. Approximately midway of the length of the frame 12 there are two cross pieces 13, separated a sufficient distance to permit the insertion of an upright 14, which is rigidly attached to said cross pieces. This upright is made of sufficient length to permit the loading of large shocks into another wagon, and may be, for example, twelve feet long. It is firmly held in position by means of braces 15 to the side member of frame 12 and braces 16 to cross pieces 17 between the side members of the frame.

From the top of upright 14 and at right angles to the central longitudinal plane of the frame 12 there extends a horizontal beam 18 of suitable length, and suitably braced to maintain it rigidly in position as by means of braces 18ª. From this beam is suspended a track 19 by suitable hangers 20, and adapted to carry a wheeled carrier 21. This carrier is provided with suitable pulleys 22, to one of which the hoisting rope 23 is attached. A second pulley 24 provided with a hook 25 is placed on this rope between the pulleys 22. This rope then passes over a pulley 26, mounted at the end of horizontal beam 18 and of size sufficient to permit the rope to clear both the track and the upper side of the beam. From here the rope 23 passes over other pulleys 27, 28, 29 along the horizontal beam and down the upright to hoisting drum 30. The pulleys may be advantageously provided with guards to prevent the escape of the rope as shown.

Hoisting drum 30 is loosely mounted on transverse shaft 31 which is mounted in bearings 32 attached to the side members of frame 12 and directly below uprights 14. The drum is provided at each end with guards or shields 33, 34 and also with a central shield or partition 35, the purpose of which will hereinafter be explained. To one of the guards or shields 33 is removably attached by bolts or otherwise a flange 36 which is part of a sleeve 37, also loosely mounted upon shaft 31. The end of this sleeve is provided with clutch member 38 and with a groove 39 in which engages an operating lever 40. Coöperating clutch member 41 is rigidly attached to shaft 31. Lever 40 is pivoted at 42 on transverse stay 43 attached to bearings 32, and is provided with a spring operated pawl 44 which engages with arcuate ratchet 45 mounted on one of the cross pieces 13. By operation of lever 40 drum 30, together with clutch member 38 may be moved on shaft 31 to connect or disconnect the clutch.

Shaft 31 is extended at one end beyond bearing 32 and is provided with a fixed sprocket wheel 46, which is operated by a chain 47 operated from sprocket wheel 48 removably attached to the spokes of one of the wheels of the wagon.

The shock lifting fork is attached to the hoisting hook 25 and is formed of two semicircular forks 49 and 50 of which one, 49 is larger than the other. The tines of the forks will thus not engage at directly opposite points of the shock to be loaded. The central tines 51, 52 of each fork is also bent laterally also to prevent engagement at exactly opposite points of the shock.

The tines of each fork are attached to semicircular supports 53, 54, and are reinforced by bands 55, 56. To each support a yoke 57, 58 is attached, which terminates in rods 59, 60 provided with eyes 61, 62.

The yokes cross at 63 and are suitably pivoted at that point. The rods 59, 60 are attached to hook 25 by suitable ropes or cables 64, 65. Lifting of hook 25 exerts a force tending to draw together the forks. They are opened by means of a toggle consisting of a long lever 66 attached pivotally to the central tine 51 of one fork and a link 67 pivoted to an intermediate point 68 on lever 66 and to central tine 52 of the other fork. A rope 69 is attached to the lever and by pulling thereon the fork may be opened to release its load.

In operation the shock loader and the wagon to receive the load are drawn parallel to each other on opposite sides of the shock. On reaching the shock they stop, and the fork is engaged with the shock, the clutch members 38 and 41 being disengaged. The shock being engaged the clutch members are engaged and the shock loader and wagon continue their parallel movement. The sprocket wheel 48 is driven by the traction of the wagon wheel, and consequently the hoisting drum is operated to raise the fork with the shock. When the shock is raised to the carrier 21 the latter travels along track 19 until the shock reaches the desired position over the receiving wagon, when it is disengaged by a pull on rope 69, the clutch members 38 and 41 being simultaneously disengaged. The entire operation is effected during movement of the wagons.

The drum 30 is divided by central partition 35 to permit of use of the device as a stationary hoisting mechanism. A draft rope or cable is then wound on one-half of the drum in a direction opposite that of winding of the hoisting rope. By operating the draft rope by a horse or otherwise the drum is rotated and a hoisting movement is effected.

To return the fork carrier to its original position a rope 70 is attached thereto and is guided by pulleys 71 along the horizontal beam and upright to a point convenient to the operator. The fork is constructed of size sufficient to embrace the whole of the shock.

By removing the braces supporting the upright and horizontal beam the device may be readily dismounted, the horizontal beam being folded against the upright.

The fork described herein is claimed in my co-pending application Ser. No. 296,806, filed May 13, 1919, which is a division hereof.

I claim:

In a shock loading device, the combination of a wagon frame, a supporting frame removably mounted thereon, a rotatable shaft mounted on the supporting frame and a divided drum freely rotatable on said shaft, an upright mounted on the supporting frame, a horizontal beam connected to the upright and having a track suspended therefrom, a carrier movably mounted on the track, a fork depending from the carrier, a rope connected to the carrier and suspending the fork from the carrier, said rope having its other end connected to the hoisting drum, means operated from one of the wheels of the wagon for driving the rotatable shaft mounted on the supporting frame, means for rigidly connecting the drum to said shaft whereby the drum may be driven by the shaft, and means operating on one portion of said divided drum to drive it independently of said shaft.

WILLIAM E. KOEPKE.

Copies of this patent may be obtained for five cents each, by addressing the "Commissioner of Patents, Washington, D. C."